MOVING HEAD MEMORY DEVICE

Filed Feb. 13, 1958 4 Sheets-Sheet 1

INVENTOR:
John P. Lekas
By Seymour Scholnick
Attorney

INVENTOR:
John P. Lekas

By Seymour Scholnick
Attorney

MOVING HEAD MEMORY DEVICE

Filed Feb. 13, 1958 4 Sheets-Sheet 3

INVENTOR:
John P. Lekas

By Seymour Scholnick
Attorney

MOVING HEAD MEMORY DEVICE

INVENTOR:
John P. Lekas
By Seymour Scholnick
Attorney

United States Patent Office 3,191,164

Patented June 22, 1965

3,191,164

MOVING HEAD MEMORY DEVICE

John P. Lekas, Hollywood, Calif., assignor, by mesne assignments, to Litton Systems, Inc., Beverly Hills, Calif., a corporation of Maryland Filed Feb. 13, 1958, Ser. No. 715,047
20 Claims. (Cl. 340—174.1)

This invention relates to a moving head memory device and more particularly to a moving head magnetic drum memory wherein continuous reading and/or recording is possible.

A magnetic memory drum is a cylinder or drum whose exterior surface is coated with a magnetic material. When the drum is rotated about an axis and a transducer head is placed contiguous to the drum's surface, information may be written (recorded on the surface of the drum) on a plurality of areas of the surface of the drum as the segments pass under the transducer head. Further, the information recorded on the drum may be read off the drum whenever that area of the surface upon which the information is recorded passes again under the transducer head.

Magnetic memory drums of the type herein described find extensive application in computer work, as well as many other fields, and especially as a memory device for medium-speed computers. One problem, however, which limits the use of such a memory device is the fact that ordinarily the memory track can be only as long as the perimeter of the drum. To overcome this difficulty multiple transducer heads have been utilized in a side by side fashion so that a series of parallel tracks are available on the surface of the drum. However, the utilization of multiple heads requires complex switching and amplifying circuits, thereby greatly complicating the memory unit and concomitantly decreasing its reliability and economy.

Recently, a novel technique to overcome the problem of short memory tracks associated with magnetic drums was developed. This technique involves the use of a moving transducer head synchronized with the rotating magnetic memory drum, in such a manner that information is recorded in a spiral track on the drum surface. The motion along the spiral track is the resultant of the combined motion of the rotating drum and the axial movement of the moving head. It is easily seen that the spiral track is many times longer than the track that can be utilized with a stationary head. This is clear when it is realized that the spiral track can be a multitude of revolutions long instead of merely one, as with the stationary head.

However, since the moving head must return to the beginning of its track and in so doing must wind a reverse spiral so as to continually cross rather than follow the spiral path it previously wound, it is clear that while the moving head is returning to the beginning of its track, it cannot be operated for writing nor can any signal read thereby be utilized. As a result, in order to have some general continuity of operation, an additional moving head is utilized which traverses a different section of the drum surface and which is placed in operation while the first head is returning to its beginning point. A device is then employed to commutate between the two heads so that the information to be read or recorded is obtained from or applied to the head which is then moving in an operative direction.

Moving head memory devices, however, still have a serious limitation in that during the period of time a moving head is changing its axial direction of motion, there is a dead or dwell time during which no recording or reading is possible. This is true since the track traversed during this period is no longer spiral and, therefore, doubles back upon itself after one revolution of the memory drum. Thus if the head were recording during this period it would destroy previous recorded information as it retraces its path so that reading of such recorded information would be impossible. Another serious limitation is that commutation between heads during the recording operation causes information to be lost. This loss of information is due to a transient current set up in the recording head during the head turn on period. Such a transient current causes erroneous information to be recorded during this period rather than the correct information.

The present invention, on the other hand, provides a moving head magnetic drum memory wherein continuous reading and/or recording are possible, at least two moving heads being utilized to record on and read off the magnetic drum. According to the basic concept of the invention the moving heads reciprocally traverse the surface of the drum in alternate operative and inoperative or rewind directions in such a manner that a plurality of periods of overlap are provided wherein two moving heads are both concurrently traversing the surface of the drum in the operative direction, commutation between the two heads taking place in the overlap periods. According to a preferred embodiment of the invention, the moving heads traverse the surface of the drum in an operative direction with a speed that is less than the speed with which the moving head traverses the surface of the drum in an inoperative, reverse, or rewind direction.

According to a specific embodiment of the invention described hereinbelow, a first and a second moving head mounted on a first tower are utilized to record while a third and a fourth moving head mounted on a second tower are utilized to read off the recorded information. The speed of each moving head in its operative direction of movement is substantially less than the speed of the moving head in the reverse or rewind direction. The difference in the two speeds is such that the time required for each head to traverse the spiral track in its operative direction is greater than the sum of the time required to traverse the spiral track in the reverse direction, and a dwell period at the beginning or the end of the spiral track. Because of this operation, as is later fully explained, there is a period wherein both the first and second moving heads are moving in the operative direction concurrently or, in other words, their movement in the operative direction overlaps slightly. During the period of concurrent movement in the operational direction, the invention is operable to commutate between the first and second heads and the third and fourth heads, whereby continuous reading and recording are possible.

Continuing with the description of the specific embodiment of the invention, the first head tower is mounted next to the surface of the drum displaced a predetermined angular distance from the second head tower. The movement of the first head is in substantial unison with the movement of the third head, while that of the second head is in substantial unison with the fourth head.

In operation, therefore, if the first moving head is moving in the operative direction but will soon enter into its dwell period, then the second moving head has just moved out of a dwell period and into axial motion in the operative direction. Therefore, commutation can be made from the first to the second moving head at this time without any interruption or loss of information due to dwell time. Since the third and fourth heads are in substantial unison with the first and second heads, respectively, commutation between output signals of the third and fourth read heads is accomplished in a like manner to thereby provide for continuous reading of recorded information. It will then be recognized that when the second head is turned on it will initially record incorrect information because of the transient currents existing during the turn on period. However, according to the invention in order to avoid any loss of recorded information during the time in which the transient current exists, the first head continues to record during this period so that the correct information is recorded by the first head. Therefore, it is possible by utilization of the teachings of the present invention to continuously record.

According to a second embodiment of the invention, a pair of moving reading heads and a pair of moving recording heads mounted on a first tower are utilized to read information off the drum and record this information back onto the drum, thereby providing a long recirculating channel of any desired length. Continuous reading and recording are possible since commutation is accomplished between the two reading heads and between the two recording heads during the periods of overlap, according to the basic concept of the invention.

In a third embodiment of the invention a first and a second head are operated in accordance with the invention wherein continuous recording without any break in the recording process is accomplished and continuous reading without any break in the reading process is accomplished. Further, switching back and forth between the recording and reading process is possible without the destruction of any of the recorded information.

It is, therefore, an object of the present invention to provide a moving head memory device wherein continuous recording and reading is possible.

Another object of the invention is to provide a moving head memory device wherein the operative period of a first moving head overlaps slightly the operative period of a second moving head.

Still another object of the invention is to provide a moving head memory device wherein the speed of axial movement of a head during its operative period is less than its speed of axial movement during the reverse or rewind period.

A still further object of the invention is to provide a moving head memory device wherein the operative periods of a first moving head and a second moving head overlap in time, commutation between the first moving head and the second moving head taking place during these periods of overlap.

Yet another object of the invention is to provide a moving head magnetic drum device wherein continuous recording and/or reading of information is performed.

Yet a further object of the invention is to provide a device for properly commutating between a pair of first and second moving heads so that it is possible for the recording or reading operation or both operations to be continuous.

Yet still another object of the invention is to provide in a moving head memory a dual rate level wind shaft for driving a moving head at a faster speed in one axial direction than in the other.

Yet another object of the invention is to provide a moving head memory device wherein a reading and a recording head move axially across a magnetic drum in substantial unison.

A further object of the invention is to provide a recirculating channel of any given length.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
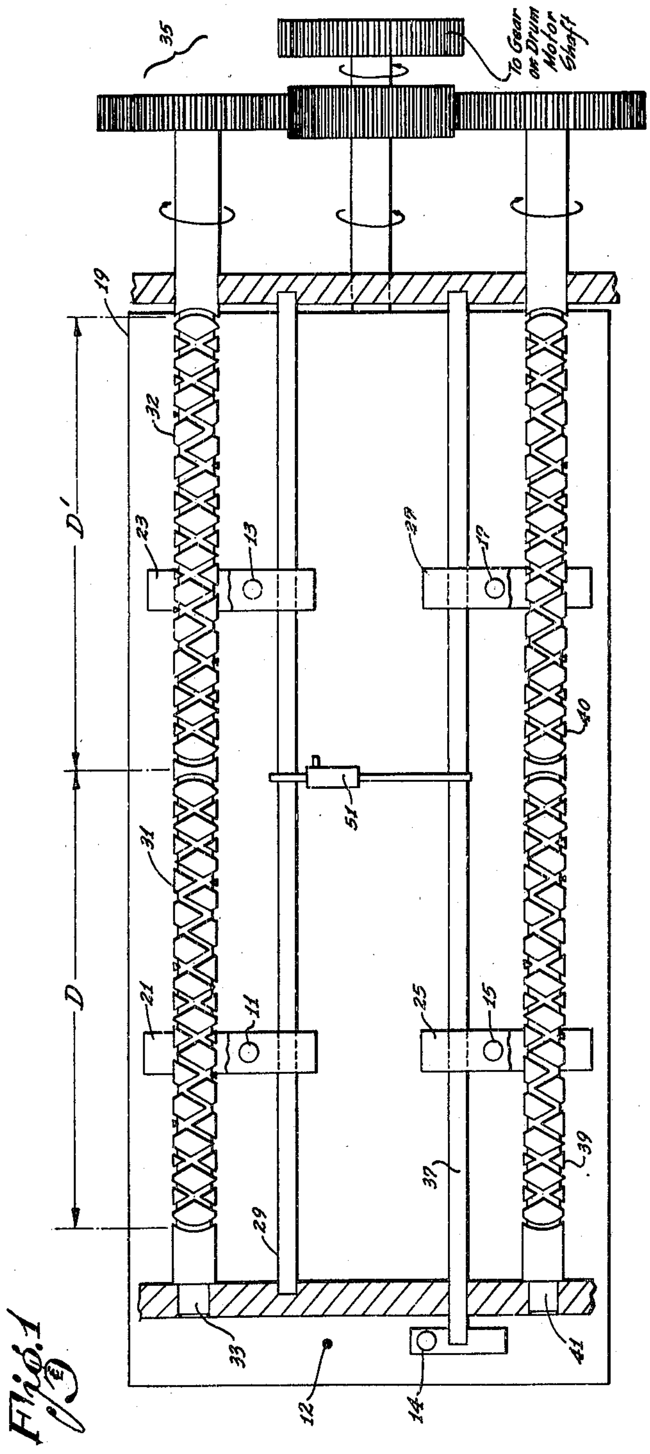
FIGURE 1 is a developed view of a magnetic drum and heads of a specific embodiment of the invention.

Referring now to the drawings, wherein like or corresponding parts are designated by the same reference characters throughout the several views, there is shown in FIGURE 1 a developed view of a specific embodiment of a moving head memory device according to the invention, illustrating its fundamental elements and mode of operation. Basically, a pair of transducer heads 11 and 13 and a pair of transducer reading heads 15 and 17 are reciprocally moved axially across the surface of a magnetic drum 19 in alternate operative and inoperative or rewind directions in such a manner that a plurality of periods of overlap are provided wherein transducer heads 11, 13, 15 and 17 are concurrently traversing the surface of the drum in the operative direction. The overlap periods are made possible by driving the transducer heads across the surface of the drum at a slower speed in the operative direction than in the reverse or rewind direction.

As shown in FIGURE 1, transducer heads 11, 13, 15 and 17 are mounted within a plurality of head carriages 21, 23, 25 and 27, respectively. Head carriages 21 and 23 are coupled to a support bar 29 which supports the two head carriages. Head carriages 21 and 23 further are axially slidable on the supporting bar and pinioned to a pair of continuous grooves 31 and 32, respectively, in a dual rate level-wind lead shaft 33. When the level wind shaft is rotated in synchronism with the rotation of drum 19 through a suitable reduction gear unit generally designated 35, head carriage 21 is driven axially across one portion of the surface of the drum defined as domain D, while head carriage 23 is driven axially across another portion of the surface of the drum defined as domain D'.

Head carriages 25 and 27 are similarly coupled to a support bar 37 and are pinioned to a pair of continuous grooves 39 and 40, respectively, in a dual rate level-wind shaft 41, which is identical to level-wind shaft 33. The pinioned head carriage 25 is driven axially back and forth across domain D of the drum while pinioned head carriage 27 is driven axially back and forth across domain D'.

Figure 2:
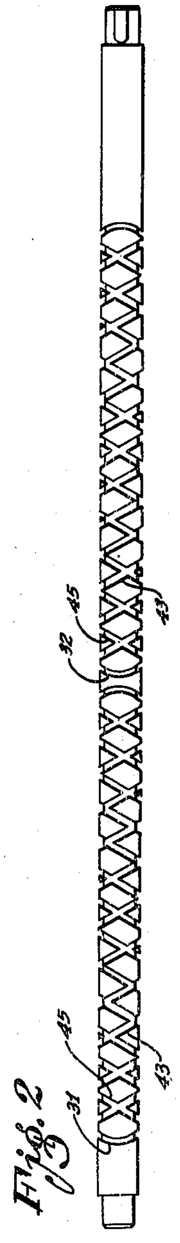
FIGURE 2 is a side elevational view of a dual rate level-wind shaft of the invention.
Figure 3:
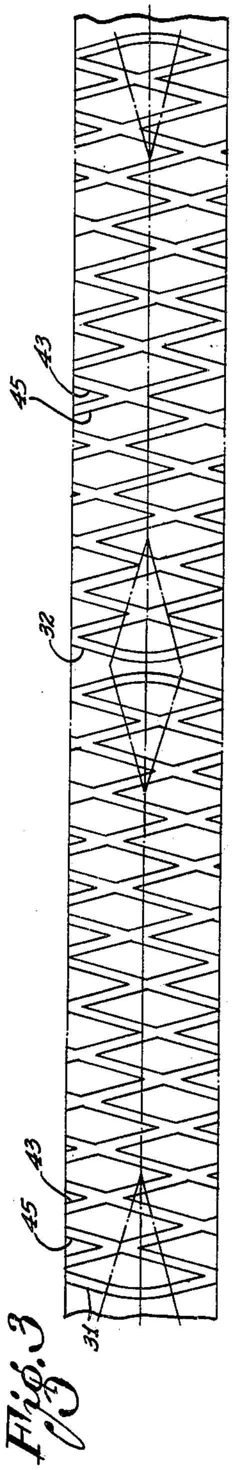
FIGURE 3 is a developed view of a portion of dual rate level-wind shaft utilized in the invention.

There is shown in FIGURE 2 a detailed side view of dual rate level-wind shafts 33 and 41. While both shafts are identical and the view is equally applicable to either shaft, for ease of description, the view will be hereinafter considered a view of level-wind shaft 33. As shown in FIGURE 2, dual rate level-wind shaft 33 comprises continuous grooves 31 and 32. Each continuous groove further comprises a forward drive section 43 and a reverse drive section 45, the pitch of the forward drive groove being less than that of the reverse drive groove. The difference in groove pitch is better illustrated in FIGURE 3, wherein a developed view of the level-wind shaft of FIGURE 2 is shown. As shown in FIGURE 3, the pitch of the forward drive groove is .3500 while that of the reverse drive groove is .4109.

As shown in FIGURE 3, the forward section of continuous groove 31 slopes in one direction, while that of continuous groove 32 slopes in the other. Thus, referring again to FIG. 1, when level-wind shaft 33 is rotated in a clockwise direction, as indicated by an arrow in FIG.1, head carriage 21 will be driven from right to left by the forward section of continuous groove 31, while head carriage 23 will be driven from left to right by the forward section of continuous groove 32. Therefore, when level-wind shaft 33 is rotated in the clock-wise direction head carriage 21 is driven across the D domain of drum 15 at a relatively slow speed when the head carriage is traversing the drum from right to left and at a relatively fast speed when traversing the drum from left to right. In addition, head carriage 23 is driven across the D′ domain of drum 15 at a slow speed when the head is traversing the drum from right to left and at a fast speed when traversing the drum from left to right, as shown in FIGURES 2 and 3.

Referring again to FIGURE 3, is it seen that at the ends of each of the continuous grooves 31 and 32 there is a circular turn around section of the continuous grooves which functions to change the direction of motion of the head carriage. The period of time during which each head carriage is driven by the turn around section of the corresponding continuous groove is designated the dwell period for the corresponding head. As hereinbefore described, level-wind shaft 41 is identical to level-wind shaft 33 and the discussion herein concerning level-wind shaft 33 and the motions of head carriages 21 and 23 applies to level-wind shaft 41, and to the motions of head carriages 25 and 27.

Figure 4:
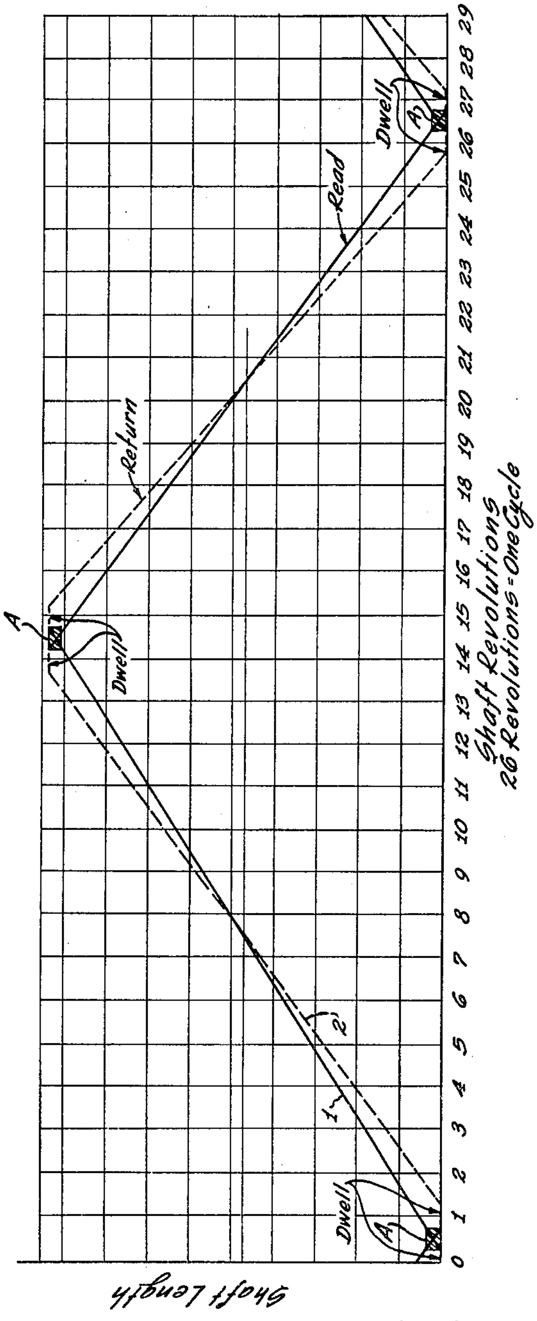
FIGURE 4 is a graph showing the relationship between the axial position of the moving heads and the number of shaft revolutions of the dual rate level-wind shaft of the invention.

Referring now to FIGURE 4, there is shown a graph of the movement of head carriages 21 and 23, as indicated by lines 1 and 2, respectively. The displacements of the head carriages on their respective continuous grooves are plotted against the number of rotations through which the level wind shafts have turned. As indicated by FIGURE 4, head carriage 21 is initially set in the turn around section of continuous groove 31 so that in one-half of a revolution the level-wind shaft will start to drive the head carriage transversely over the D domain of the drum by means of the forward drive section of continuous groove 31. Head carriage 23, as indicated by line 2 of FIGURE 4, is set to be driven into the circular turn around section or, in other words set to go into the dwell period and then to be driven transversely over the D′ domain of the drum. As will be hereinafter discussed, in the specific embodiment of the invention, herein described a commutating circuit functions to render each of heads 11 and 13 operable for recording when it is being driven by the forward drive section of its corresponding continuous groove and inoperable when it is being driven by the rewind drive section. Therefore, when a head carriage is being driven by the forward drive section, it is herein referred to as traversing the drum in the operative direction, while if it is being driven by the rewind drive section, then it is herein referred to as traversing the drum in the inoperative reverse or rewind direction.

As indicated in FIGURE 1, when the drum starts to rotate in the counter-clock-wise direction it causes level-wind shaft 33 to rotate in a clock-wise direction by means of the coupling through gear train 35. As shown in FIGURE 4, by line 1, as level-wind shaft 33 rotates, head carriage 21 traverses the D domain of the drum in the operative direction and thereby transducer head 11 records a spiral path upon the D domain. Head carriage 23 traverses the D′ domain in the rewind direction, therefore, head 13 is rendered inoperative by the commutation circuit, to be hereafter discussed. (Heads 11 and 13 are shown as operative or inoperative in FIGURE 4 by lines 1 and 2, respectively, being solid or broken respectively.) However, head carriage 23 is moving at a faster speed than head carriage 21; therefore, as shown in FIGURE 4 by line 2, 12¾ revolutions after the level-wind shaft starts to rotate head carriage 23 moves into the turn around section of continuous groove 31 and at 13¼ revolutions the carriage is ready to traverse the D′ domain in the operative direction. At this point the commutation circuit renders head carriage 23 operative and it begins to record in its spiral track on the D′ domain of drum 19. Therefore, during the period from 13¼ revolutions to 13¾ revolutions, both transducer heads 11 and 13 are recording, concurrently. At 13¾ revolutions head carriage 21 is about to enter the turn around section of continuous groove 32 and the commutation circuit renders transducer head 11 inoperative. Therefore, during ½ a revolution of level-wind shaft 33, both recording heads are operative. However, for a short period of time after transducer head 13 is rendered operative, it records erroneous information because of a turn-on transient current. The correct information is recorded, however, by transducer head 11. As will be hereinafter discussed, provisions must be made in connection with the read heads in order that the erroneous information recorded by transducer head 13 is not read off the drum by read heads 15 and 17.

As indicated in FIGURE 4, after 13¾ revolutions of level-wind shaft 33 and until 26¼ revolutions are accomplished head carriage 23 moves in the operative direction. Head carriage 21 moves in the rewind direction until 25¾ revolutions when the head carriage goes into its dwell or turn around period. At 26¼ revolutions head carriage 21 moves out of the dwell period and begins to traverse the D domain in the operative direction whereby the commutation circuit renders transducer head 11 operative. At 26¾ revolutions head carriage 23 goes into the dwell period and the commutation circuit thereby renders transducer head 13 inoperable, as indicated in FIG. 4. It should be noted that at 26 revolutions head carriages 21 and 23 occupy their initial positions on the level-wind shaft; therefore, the period of the cycle movement of the head carriages is 26 revolutions of the level wind shaft. If it is assumed that the drum of the preferred embodiment is rotating at 40 cycles per second and an 8 to 1 reduction gear ratio is used in driving level-wind shaft 33, then the time required for one sweep of the drum is about 5 seconds.

Since reading head carriages 25 and 27 traverse domain D and D′, respectively, substantially in unison with recording head carriages 21 and 23, respectively, lines 1 and 2 of FIG. 4 may also be considered to approximately indicate the position on level-wind shaft 41 of head carriages 25 and 27, respectively. Since reading heads read off the drum without destroying the information stored on the drum both heads may be maintained continuously operative. The commutation circuit, hereinafter discussed, however, commutates between output signals derived from the two heads at a predetermined point A within the period of overlap of the recording heads, and at a time after the start of the overlap period when the turn on transient is susbtantially over, as indicated in FIG. 4 by the shaded area.

For example, from ¾ of a revolution after the initial position to 13¼ revolutions of level-wind shaft 41, reading heads 15 and 17 are operative; however, only the signal from reading head 15 is utilized. At the predetermined point A, 13½ revolutions, switching is accomplished between reading head 15 and reading head 17 so that the output signal from reading head 17 is utilized only. In the preferred embodiment of the invention, the predetermined point is located midway between the beginning and ending of the period of recording overlap.

As was hereinbefore noted, a turn on transient is generated whenever transducer head 11 or 13 is turned on, thereby causing the head to record incorrect information during the period that the transient is in existence, which may be about 30 microseconds. However, since the period of overlap is about 100 milliseconds in duration, point A follows the start of the period of overlap by a time lag of 50 milliseconds. Therefore, the output signal of reading head 17 is utilized 50 milliseconds after recording transducer head 13 is turned on so that the incorrect information recorded as a result of transient delay is not utilized.

Figure 5:
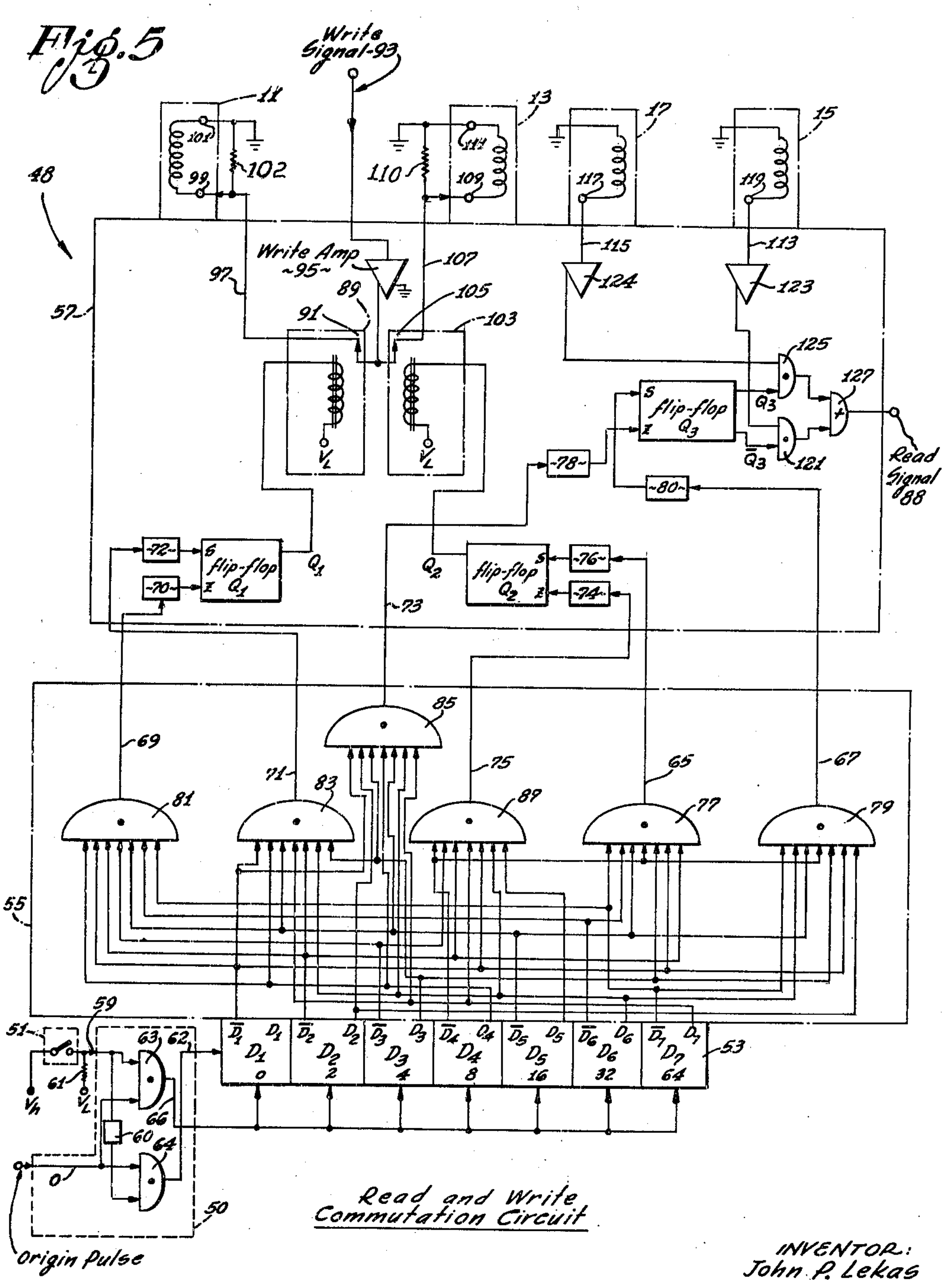
FIGURE 5 is a partly block, partly circuit diagram of a commutation circuit of the invention.

Referring now to FIGURE 5, there is shown a partly block, partly circuit diagram of a commutation circuit, generally designated 48, in accordance with the invention which is operable to commutate between transducer heads 11 and 13 and between the output signals of reading heads 15 and 17. According to the basic concept of the invention, the commutation circuit of the invention counts the number of revolutions of drum 19 and at a plurality of predetermined revolutions performs the corresponding commutations. As shown in FIGURE 5, the commutation circuit includes four major components, namely: a gating circuit 50 which is responsive to application of an origin pulse O derived at each drum rotation and to application of a bivalued signal 59 derived at each full cycle of the moving heads to generate a count pulse 62 and a reset pulse 66; a reset counter generally designated 53 which is operable to count the applied count pulses and generate digital signals representative of the count and which is further operable to be reset to a zero count upon application of reset pulse 66; an actuator 55 responsive to the digital signals generated by counter 53 to generate a plurality of actuating signals 65, 69, 71, 67, 75, and 73; and a switching circuit 57 responsive to the plurality of actuating signals for rendering transducer heads 11 and 13 operative and inoperative and for selecting the output signal of either reading head 15 or 17.

Before examining in detail the operation of commutation circuit 48 attention is directed to the sources of bivalued signal 59 and origin pulse O. As shown in FIGURE 1, a microswitch 51 is mounted on the first head tower and is positioned such that head carriage 23 strikes the actuating button of the switch when the head carriage ends its movement in the rewind direction and is about to enter the turn around section of the continuous groove. When head carriage 23 strikes the button of switch 51, the switch is closed for a period of time which is equal to the time required for drum 19 to complete one revolution. As shown in FIG. 5, one terminal of switch 51 is connected to a source of high level potential $V_h$ while the the other terminal of the switch is connected to conductor 59 and a source of low level potential $V_L$ through a resistor 61 so that when the switch is closed current flows between $V_h$ and $V_L$ resulting in a voltage drop across resistor 61, thereby developing the bivalued signal 59, at the high level $V_H$ while when the switch is open bivalued signal 59 is generated at the low level $V_L$.

As indicated in FIG. 1, the source of the origin pulse comprises a magnetized origin spot 12, located on a portion of the surface of drum 19 which is not within the sweep of the movable heads, and a conventional fixed transducer head 14 so located that the origin spot passes under the head once each revolution of drum 19. In this manner origin pulse O is generated by head 14 once each revolution of drum 19 at a time when the drum is at a predetermined angular position and after suitable amplification it is applied to gating circuit 50.

As hereinbefore stated gating circuit 50 is responsive to origin pulse O and bivalued signal 59 to generate a count pulse 62 and a reset pulse 66. Bivalued signal 59 is applied within gating unit 50 to a first input of an "and" gate 63 and to a first input of an "and" gate 64 through an inverting amplifier 60, while the origin pulse is applied to a second input terminal of gate 64 and a second input terminal of gate 63. Gates 63 and 64 like the subsequent "and" gates to be hereinafter described, generate a high level signal when all the input signals applied to the gates are at a high level, and generate a low level signal whenever any one of the input signals applied to the gates is at a low level. (Since the structure and detailed operation of conventional "and" gates are well known in the art, they need not be further discussed herein.) Therefore, gate 63 generates a high level reset pulse 66 whenever the origin pulse is generated, and microswitch 51 is closed, while gate 64 generates the count pulse when bivalued signal 59 is at the low level.

Considering now reset counter 53, the counter is responsive to each count pulse 62 to count one count and to reset pulse 66 for resetting the counter to zero. As indicated in FIG. 5, the counter is a radix 2 counter with 7 modulo 2 counter stages $D_1$, $D_2$, $D_3$, $D_4$, $D_5$, $D_6$ and $D_7$. Each modulo 2 stage of the counter in turn comprises a bilevel flip-flop circuit and associated coupling of the type shown and described in page 15 of "High-Speed Computing Devices," by engineering Research Associates, published in 1950 by McGraw-Hill Book Company, Inc., New York and London.

Each counter modulo stage designated D of the counter generates a bilevel signal D having high and low levels and a complementary signal $\overline{D}$. The magnitude of the digit position of each stage is successively 1, 2, 4, 8, 16, 32 and 64 with counter stage $D_1$ being the lowest order stage and stage $D_7$ being the highest order stage. Each stage generates bilevel signal D at the low level and the complementary signal $\overline{D}$ at the high level when the stage is at the zero state and generates bilevel signal D at the high level and the complementary signal $\overline{D}$ at the low level when the stage is at the magnitude of the digit position. For example, counter 53 would express the number 4 by stages $D_1$, $D_2$, $D_4$, $D_5$, $D_6$ and $D_7$ generating signals $D_1$, $D_2$, $D_4$, $D_5$, $D_6$ and $D_7$ at the low levels respectively, while stage $D_3$ generates bilevel signal $D_3$ at the high level.

As shown in FIG. 5, the count pulse is applied to the lowest order stage of counter 53 and the counter is responsive thereto to count successive pulses, until the origin pulse occurs at a time when micro switch 51 is closed. At this time the counter is zeroed and the counter begins to count count pulses again from zero. Since, as shown in FIG. 1, head carriage 23 closes microswitch 51 only once each cycle of movement of the head carriage and switch 51 remains closed for a period of time equal to the time required for one revolution of the drum the counter is zeroed once each cycle of movement of head carriages. It is clear, therefore, that during each cycle of operation the magnitude of the number of pulses counted by counter 53 is proportional to the position of head carriage 23 and is similarly representative of the positions of the remaining head carriages.

As shown in FIG. 5, actuator 55 is responsive to the bilevel digital signals generated by the counter to produce actuating signals 65, 67, 69, 71, 73 and 75. Actuating signals 65, 67, 69, 71, 73 and 75 are generated, whenever counter 53 has the values 4, 6, 108, 110, 112, respectively, by a plurality of "and" gates 77, 79, 81, 83, 85, and 87 respectively. ("And" gates are designated in FIG. 5 by a hood with a dot therein.) The significance of the count values 4, 6, 8, 108, 110, 112 are hereinafter fully discussed.

As shown in FIG. 5, the bilevel complementary signals $\overline{D}_1$, $\overline{D}_2$, $\overline{D}_4$, $\overline{D}_5$, $\overline{D}_6$ and $\overline{D}_7$ are applied over correspondingly designated conductors to "and" gate 77 along with bilevel signal $D_3$ and when the counter registers four all the signals carried over the foregoing conductors will be at the high level; therefore, a high level actuating signal 65 is produced. In a similar manner, the other actuating signals are generated, as is more fully shown in Table A below.

*Table A*

| Count | Represented by Signals | Applied to Gate | Actuating Signal Generated |
|---|---|---|---|
| 4 | $\overline{D}_1$ $\overline{D}_2$ $\overline{D}_3$ $\overline{D}_4$<br>$\overline{D}_5$ $\overline{D}_6$ $\overline{D}_7$ | 77 | 65 |
| 6 | $\overline{D}_1$ $D_2$ $D_3$ $\overline{D}_4$<br>$\overline{D}_5$ $\overline{D}_6$ $\overline{D}_7$ | 79 | 67 |
| 8 | $\overline{D}^1$ $\overline{D}_2$ $\overline{D}_3$ $D_4$<br>$\overline{D}_5$ $\overline{D}_6$ $\overline{D}_7$ | 81 | 69 |
| 108 | $\overline{D}_1$ $\overline{D}_2$ $D_3$ $D_4$<br>$\overline{D}_5$ $D_6$ $D_7$ | 83 | 71 |
| 110 | $\overline{D}_1$ $D_2$ $D_3$ $D_4$<br>$\overline{D}_5$ $D_6$ $D_7$ | 85 | 73 |
| 112 | $\overline{D}_1$ $\overline{D}_2$ $\overline{D}_3$ $\overline{D}_4$<br>$D_5$ $D_6$ $D_7$ | 87 | 75 |

As indicated in FIG. 5, switching circuit 57 is responsive to the actuating signals to commutate between recording heads 11 and 13 and between the output signals of reading heads 15 and 17. In more detail, the switching circuit is responsive to actuating signal 65 to render transducer head 13 operable, and is responsive to actuating signal 75 to render transducer head 13 inoperable. Switching circuit 57 is responsive to actuating signal 71 to render transducer head 11 operable and to actuating signal 69 to render the head inoperable. Further, the switching circuit is responsive to actuating signal 73 to couple reading head 15 to a read signal terminal 88 and to decouple reading head 17. Read signal terminal 88 is coupled to a computer or any other device requiring the stored information. Switching circuit 57 is responsive to actuating signal 67 to couple reading head 17 to the read signal terminal and to decouple reading head 15.

As shown in FIG. 5, actuating signals 69 and 71 are applied through a pair of inverters 70 and 72, respectively, to the Z (Zero) input terminal and the S (set) input terminal, respectively, of a bistable flip-flop $Q_1$ while actuating signals 75 and 65 are applied through a pair of inverters 74 and 76, respectively, to the Z input and S input, respectively, of bistable flip-flop $Q_2$. In addition, actuating signals 73 and 67 are applied through a pair of inverters 78 and 80, respectively, to the Z input and S input of bistable flip-flop circuit $Q_3$. Flip-flops $Q_1$ and $Q_2$ generate output signals $Q_1$, $\overline{Q}_1$, and $Q_2$, $\overline{Q}_2$, respectively, while flip-flop $Q_3$ generates output signal $Q_3$ and complementary output signal $\overline{Q}_3$.

In operation, flip-flop $Q_1$ generates high and low level signal $Q_1$ and complementary signal $\overline{Q}_1$ and is responsive to the application of an input signal to its S input terminal for being set to its "set" state and to the application of an input signal to its Z input terminal for being set to its "zero" state. When the flip-flop is in its "set" state, signal $Q_1$ will be at its high level, while complementary signal $\overline{Q}_1$ will be at its low level. Conversely, when flip-flop $Q_1$ is at its "zero" state, signal Q will be at a low level while complementary signal $\overline{Q}_1$ will be at a high level. The detailed structure for one suitable form of flip-flop can be found in the United States Patent 2,733,430 issued to F. G. Steele, on January 31, 1956, entitled "Angular Quantizer."

As shown in FIG. 5, signal $Q_1$ is applied to a relay 89 which is responsive thereto at the high and low level to respectively close and open a pair of relay contact points designated 91. A write signal 93 produced by an external source (not shown) or from read signal terminal 88 is amplified by an amplifier 95 and is applied to one contact point of the pair of contact points 91, while the other contact point is connected to a conductor 97 which is coupled to an input terminal 99 of transducer head 11. A terminal 101 of transducer head 11 is connected to a source of ground potential as well as to one end of a resistor 102, the other end of the resistor being connected to terminal 99, as shown in FIG. 5. Signal $Q_2$ is applied to a relay 103 which is responsive thereto at the high and low level to close and open, respectively, a pair of contact points designated 105. Write signal 93 is applied to one contact point of contact points 105 while the remaining contact point is connected to a conductor 107. Conductor 107 is further coupled to an input terminal 109 of transducer head 13 while a terminal 111 of transducer head 11 is connected to a source of ground potential as well as to one end of a resistor 110, the other end of the resistor being connected to terminal 109.

Referring now to read transducer heads 15 and 17, a pair of read signals 113 and 115 are generated by transducer heads 15 and 17, respectively. Read signal 113 is passed over a correspondingly designated conductor 113 through a read amplifier 123 to an "and" gate 121. Read signal 115 is passed over a correspondingly designated conductor 115 through a read amplifier 124 to an "and" gate 125. Hereinbefore mentioned signals $Q_3$ and $\overline{Q}_3$ are applied to gates 125 and 121, respectively. Gate 125 passes read signal 115 when signal $Q_3$ is at the high level while gate 121 passes read signal 113 when signal $\overline{Q}_3$ is at the high level. The output signals of gates 125 and 121 are applied to an "or" gate 127 which is responsive thereto to pass either read signal 113 or read signal 115 to read signal terminal 88. Since signal $Q_3$ and signal $\overline{Q}_3$ are complementary, gates 125 and 121 never pass read signals 113 and 115 concurrently, so that gate 127 will pass whichever of the two signals is passed by the two "and" gates. The structure and operation of an "or" gate suitable for use as gate 127 is well known in the art and need not be further discussed herein.

Considering now the overall operation of the switching circuit, when actuating signal 65 is applied to flip-flop $Q_2$, signal $Q_2$ goes high and relay 103 is closed, thereby passing write signal 93 to transducer head 13. When actuating signal 67 is applied to flip-flop $Q_3$, signal $Q_3$ goes high and signal $\overline{Q}_3$ low so that gate 125 passes read signal 115 from reading head 17 to read signal terminal 88 while gate 121 fails to pass read signal 113 from reading head 15 to the read terminal. When actuating signal 69 is applied to flip-flop $Q_1$, signal $Q_1$ goes low and relay 89 is opened, thereby stopping write signal 93 from passing to transducer head 11, and at the time actuating signal 71 is applied to flip-flop $Q_1$, signal $Q_1$ goes high again and relay 89 is closed, thereby passing write signal 93 to transducer head 11. When actuating signal 73 is applied to flip-flop $Q_3$, signal $\overline{Q}_3$ goes high and signal $Q_3$ goes low so that signal 113 generated by reading head 15 is passed to read signal terminal 88 while signal 115 generated by reading head 17 is not. At the time actuating signal 75 is applied to flip-flop $Q_2$, signal $Q_2$ goes low and relay 103 is opened, thereby preventing the passage of write signal 93 to transducer head 13. After actuating signal 75 is applied to flip-flop $Q_2$ and write signal 93 is prevented from passing to transducer head 13, actuating signal 65 is again received and the cycle herein described repeats itself.

Referring now to the overall operation of the preferred embodiment of the invention, as shown in FIG. 1, when head carriage 23 is driven from the rewind direction into the circular turn around section, microswitch 51 is closed. In FIG. 4 the point at which switch 51 is closed is indicated to occur at 12¾ revolutions of the level-wind lead shafts and the next origin pulse O to occur zeros counter 53. Four revolutions later of drum 15, or when the reset counter registers four, actuating signal 65 is generated at the high level, thereby rendering transducer head 13 of head carriage 23 operative. Since in the preferred embodiment of the invention the gear reduction ratio of reduction gear unit 35 is 8 to 1, the 8 revolutions of the drum will correspond in time to 1 revolution of the level-wind head shafts. Therefore, transducer head 13 is rendered operative at 13¼ revolutions, as shown in FIG. 4. In a like manner, actuating pulse 69 renders transducer head 11 of head carriage 21 inoperative at 8 revolutions of drum 19 after zeroing or when the reset counter registers 8 which corresponds to 13¾ revolutions of the level-wind shafts, as shown in FIG. 4. It should be noted that during the period wherein heads 11 and 13 are both operative, namely, when the counter registers 6 or 13½ revolutions, as shown in FIG. 4, the output signal of reading head 17 is selected. At 108 revolutions of drum 19 after zeroing and when the reset counter registers 108 or, in other words, at 26¼ revolutions of the level-wind shafts as shown in FIG. 4, actuating pulse 71 renders transducer head 11 of head carriage 21 operative. At 112 revolutions of drum 19 after zeroing and when the counter registers 112, or at 26¾ revolutions of the level-wind shafts, as shown in FIG. 4, actuating pulse 75 causes signal $Q_2$ to be generated at the low level which opens relay 103 and renders transducer head 13 inoperative.

Again it should be noted that midway through the period of concurrent operation of transducer heads 11 and 13, namely, at 110 revolutions of drum 19 and when counter 53 registers 110, actuating signal 73 causes the output signal of reading head 15 to be selected. Then at 208 revolutions after the reset counter is reset or 26 revolutions of the level-wind shafts after reset, head carriage 23 again contacts the actuating button of micro-switch 51, thereby again resetting counter 53 to zero.

The cycle of operating, herein described, then repeats itself. Therefore, the commutation circuit of the invention commutates between transducer heads 11 and 13 in such a manner that it is possible to continuously record without the loss of any bit of information.

It should be understood that in the particular embodiment of the invention shown in FIG. 1, it is intended that information which has just been recorded on the drum by write heads 11 or 13, will thereafter be read after approximately half a drum turn delay by the corresponding read heads 15 or 17 respectively. In the spiral tracks in which the write heads are recording, half a drum turn delay between writing and reading corresponds to a continual displacement between write and read heads of 180° circumferential displacement and approximately .1750 inch axial offset. Read head 15 as shown in FIG. 1 is therefore so positioned with respect to write head 11 and moves in apparent unison therewith to maintain the required displacement; while read head 17 is similarly situated and moved with respect to write head 13.

It will be apparent however, that longer delays, as required, could be obtained by increasing the axial (and/or angular) offset of the read heads from the write heads so that a greater number of drum turn delays would elapse between reading and writing. For example in obtaining successively longer and longer delays, read head 15 would be positioned with successively greater axial offset in following head 11 until maximum offset in the following direction was attained. Then to obtain still greater delay, the read head would be positioned at maximum offset in the opposite "preceding" direction and then successively reduced in offset until it was only ½ track turn in advance of preceding head 11.

This delay time may be varied by changing the displacement by which the read head 15 follows or is in advance of write head 11. The least delay is obtained when the read head immediately follows its write head, and greatest delay is obtained when the read head immediately precedes its write head. In every instance read head 17 would be correspondingly positioned with respect to its write head 13. In such operation, with longer time delays, it is clear that the read heads 15 and 17 would at times be moving in opposition to their corresponding write heads 11 and 13 and would enter their dwell periods at different times than the write heads. In accordance with such operation, the electronic commutation of the read heads would be adjusted to occur at correspondingly varied time (as may readily be accomplished by utilizing modified gates 79 and 85 which recognize different counts of the counter 53, shown in FIG. 5).

It is thus clear that in the general operation of the invention, any phasing between the read and write heads may be utilized in accordance with the delay desired. The relative phasing between the two read heads is of course maintained in accordance with the schedule shown in FIG. 4, and the relative phasing between the two write heads is similarly maintained.

It is apparent from the foregoing discussion that if ready adjustment of delay time over a wide range is not required (as when a fixed predetermined delay is to be utilized), then the read heads need not be separately mounted but may each be mounted on a common head carriage with its associated write head, thus saving considerable equipment expense and improving synchronism between read and write heads. Such an embodiment of the invention is shown in FIG. 6.

Figure 6:
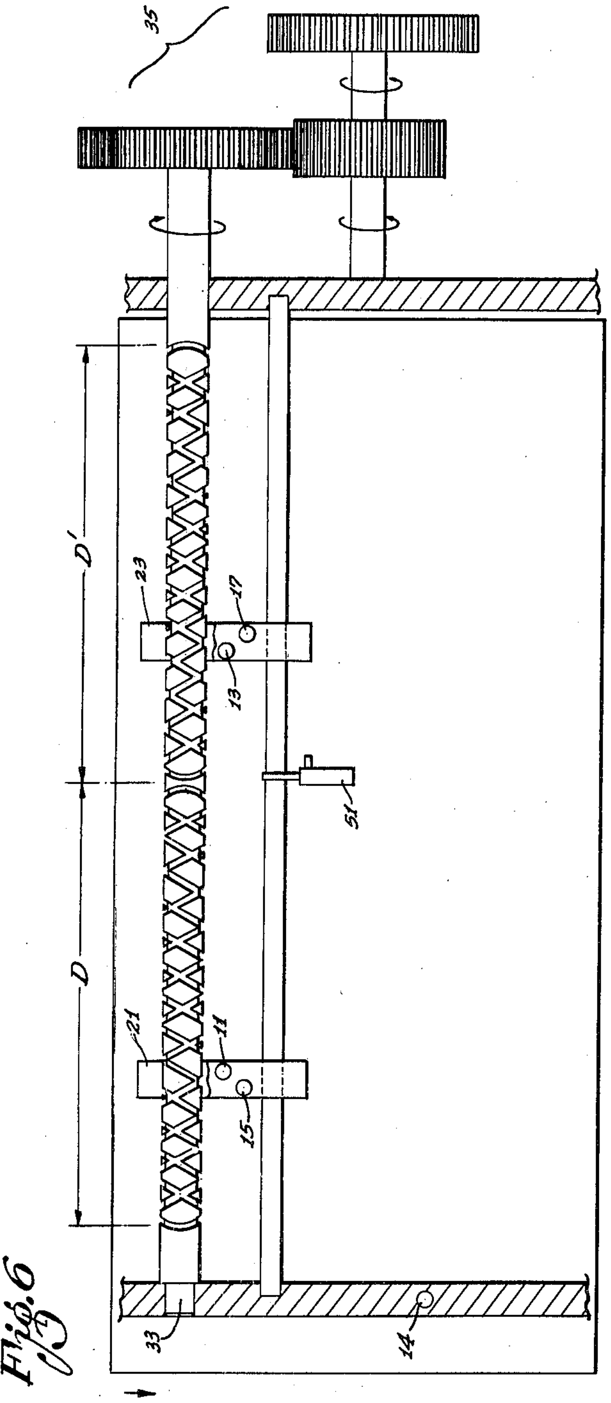
FIGURE 6 is a developed view of a magnetic drum and associated heads of a modified embodiment of the invention.

As shown in FIGURE 6, head carriages 21 and 23 are mounted on a head tower and move across the surface of a drum in the same manner as described in the previously described embodiment of the invention. However, reading head 15 and recording head 11 are mounted on head carriage 21 diagonally so that reading head 15 passes over each segment of the recording track of the D region of the drum immediately before recording head 11. In a similar manner, reading head 17 and recording head 13 are mounted on head carriage 23 so that during the period both heads are moving in the operative direction, reading head 17 passes over the recorded track before recording head 13.

It is apparent that in the particular modified form of the invention shown in FIG. 6, the displacement between read heads and write heads is such that maximum delay is obtained between recording of information and reading of the recorded information. In the present embodiment of the invention approximately a 5 second delay is obtained.

The commutation circuit shown in FIG. 5 may be utilized without change to control the commutation operations of the modified form of the invention shown in FIG. 6, as well as the form of the invention shown in FIG. 1. Since the read heads are relatively quite close to the write heads in both instances, the same timing of commutation operations will suffice for both embodiments of the invention.

One of the most important usages of electrically continuous spiral recording tracks, such as is provided in the present invention, is in mechanization of a recirculating storage register, wherein signals recorded by the write head and read after a predetermined delay by the read head, are continuously reapplied either in unchanged or modified form to the write head to be rerecorded so that in overall operation stored signals are continually recirculated between the read and write heads.

Figure 7:
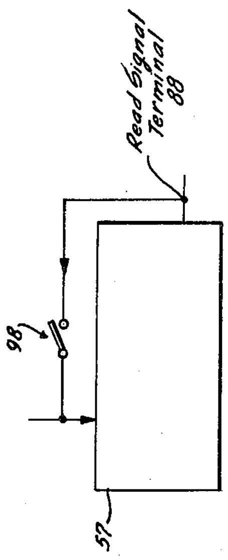
FIGURE 7 is a block diagram of the read and record head connections of the modified embodiment of the invention.

In adapting the present invention for use as a recirculating storing register, there need only be provided means for reapplying signals read by the operational read head to the write head which is then being utilized. This can readily be effected by coupling read signal terminal 88 (shown in FIG. 5) to write signal conductor 93. In FIG. 7, there is shown a simple apparatus for selectively effecting such a connection, comprising a switch 98, intercoupling read terminal 88 and write signal conductor 93, the switch being selectively closeable to effect recirculation of recorded information. Such recirculation of information may obviously be accomplished with both embodiments of the invention as shown in FIGS. 1 and 6, but will be particularly preferred in association with the embodiment of FIG. 6 because of the more accurate synchronization of read and write heads attainable with this embodiment.

Examining the operation of the embodiment of FIG. 6 in a recirculating mode of operation, if it is assumed that head carriage 21 is moving in the operative direction then reading head 15 reads the information off the D region of the drum. The information is passed to read terminal 88 and thereby to write amplifier 95. The output of write amplifier 95 is applied to head 11 which records the information back on the D region of the drum. In the same manner reading head 17 reads the information off the D' region of the drum and recording head 13 records the information back on the drum. The operation of commutation between the output signals of the reading heads and between recording heads is the same as hereinbefore described in connection with the preferred embodiment of the invention, and therefore will not be further discussed herein.

It will be understood of course that the moving head memory device of the present invention may be modified or altered in many further particulars without departing from the invention.

For example, while it has been shown that continuous recording of information in the spiral tracks may be accomplished without any break in recording, utilizing only two heads (as for example with heads 11 and 13), and it has also been shown that continuous reading may be accomplished using another pair of heads (as for example with heads 15 and 17); it should also be clear in accordance with the teachings of the present invention that when alternate recording and reading operations are required, a single pair of heads (mounted on a single head tower) may be utilized in both processes. In such a mode of operation moreover, switching back and forth between the recording and reading processes may be accomplished without destruction of any recorded information.

Let it be assumed for example that the single pair of heads comprises a first and second head being moved in accordance with the schedule of motions shown by lines 1 and 2 respectively of FIG. 4. Let it further be assumed that the heads have been continuously recording for many cycles of head movement and that it is desired to switch to the reading operation. As may be inferred from a consideration of FIG. 4, at zero revolutions the second head is recording and moving in the operative direction while the first head is moving through the turn around section of the continuous groove of the level-wind shaft and became operative to record on entering the section. At ¼ revolution the first head moves out of the turn around section and into the forward drive section, whereby it records while moving in the operative direction. At ¾ of a revolution the second head goes into the turn around section and at this time switches from recording to reading and reads while it traverses the drum in the rewind direction. This does no harm, however, since the reading operation is non-destructive. At 13¼ revolutions the second head begins to traverse the drum in the operative direction, thereby reading the recorded information off the drum. At 13¾ revolutions the first head moves into the turn around section and at this time switches from recording to reading so that at 26¼ revolutions it will be ready to read the recorded information correctly since it will then be moving in the forward direction. Therefore, by commutating between the read signals of the first and second heads in such a manner that the read signal is utilized only when the head is moving in the operative direction, the contemplated moving head system is able to switch from continuous recording to continuous reading without destroying one bit of information recorded on the drum.

Assume next that the first and second heads have been continuously reading and it is wished to switch to continuous recording. As indicated in FIG. 4, at zero revolutions the second head is reading while moving in the operative direction and the first head is reading while moving through the turn around section of the continuous groove. At ¼ of a revolution the first head moves in the operative direction and is reading while at ¾ of a revolution the second head moves into the turn around section and is switched off altogether. At 12¾ revolutions the second head moves into the turn around section and is switched operative to record so that at 13¼ revolutions it will record correct information. At 13¾ revolutions the first head is rendered inoperable and at 25¾ revolutions it is again rendered operative but to record rather than to read, so that at 26¼ revolutions it will record correct information concurrently with the second head. At this point the contemplated moving head system has switched from reading to recording without the destruction of one bit of recorded information. Thus switching back and forth between both processes has been accomplished.

Many other modifications and variations of the basic invention will readily be suggested to those skilled in the art.

What is claimed as new is:

1. A magnetic memory device for storing information, said memory device comprising: a drum having a magnetizable surface; rotating means for rotating said drum; first and second head carriages having mounted thereto first and second transducer heads respectively, said first and second transducer heads being selectively operable for recording information onto said magnetizable surface of said drum; third and fourth head carriages having mounted thereto third and fourth transducer heads, respectively, said third and fourth transducer heads being operable to read the recorded information off said magnetizable surface of said drum for generating a first read signal and a second read signal, respectively; driving means coupled to the drum and operable to drive each of said four head carriages across the surface of the drum in a corresponding operative strike and a corresponding reciprocal rewind stroke at a slower speed in said corresponding operative stroke than in said corresponding rewind stroke, said four head carriages being positioned relative to said driving means so that said driving means continually drives at least one of said first and second head carriages in its corresponding operative strokes and continually drives at least one of said third and fourth head carriages in its corresponding operational stroke, said driving means driving both said first and second head carriages concurrently in their corresponding operative strokes during a first predetermined overlap period and driving both said third and fourth head carriages concurrently in their corresponding operative strokes during a second predetermined overlap period; first commutation means coupled to the drum for rendering said first transducer head operable while said driving means drives said second head carriage in said corresponding operative stroke and for rendering said second transducer head inoperable while said first head carriage is driven in said corresponding operative stroke and before said second head carriage is driven in said corresponding rewind stroke, said first commutation means further being operable to render said second transducer head operable while said driving means drives said first head carriage in said corresponding operative stroke and for rendering said first transducer head inoperative while said second head carriage is driven in said corresponding operative stroke and before said first head carriage is driven in said corresponding rewind stroke; and second commutation means coupled to the drum and selectively operable in a first and second mode of operation for selecting said first and second read signals, respectively, said commutation means changing its mode of operation at a predetermined point within each of said plurality of overlap periods.

2. The combination defined in claim 1 which further includes coupling means for applying the selected read signal to said first and second transducer heads whereby a continuously operating recirculating resistor having a continuous recirculating channel is formed.

3. In a moving head memory drum device capable of continuously storing information on the surface of a rotating drum, the combination comprising: a first and second transducer head positioned adjacent the drum and movable across the surface of the drum; driving means synchronously intercoupling the first and second transducer heads with each other and with the drum for reciprocally driving said first head across the surface of the drum in a first drive stroke and a first return stroke and for reciprocally driving said second head across the surface of the drum in a second drive stroke and second return stroke, said first and second heads being driven to traverse a first and second portion of a helical channel, respectively, on the periphery of the drum during said first and second drive strokes, respectively, said heads being synchronously driven by said driving means in a predetermined phase relationship for driving both said first and second heads concurrently in said first and second drive strokes, respectively, during predetermined overlap periods, thereby to enable a continuous storing of information on the drum.

4. In a recirculating magnetic memory device for enabling the continuous recording of a single channel of information, the combination comprising: a drum having a magnetizable surface; a first read head and a first write head each reciprocally movable across a first portion of the surface of the drum in a first operational and a first rewind direction; a second read head and a second write head reciprocally movable across a second portion of the surface of the drum in a second operational direction and a second rewind direction; driving means for synchronously driving said first read and write heads across the surface of the drum at a slower speed in said first operational direction than in said first rewind direction and for driving said second read and write head across the surface of the drum at a slower speed in said second operational direction than in said second rewind direction; said driving means synchronously interconnecting said first and second write heads in a predetermined phase relationship to enable the continuous recording of a single channel of information and said drive means synchronously interconnecting said first and second read heads in a predetermined phase relationship to enable the continuous reading of said single channel of information, and coupling means for electrically intercoupling said first read head to said first write head and for intercoupling said second read head to said second write head.

5. A rotating magnetic drum memory device for enabling the continuous transducing of a single channel of information, said device comprising: a magnetic drum having a substantially smooth cylindrical surface; a first head carriage having a first transducer head mounted thereon and reciprocally moveable across the surface of the drum in a first operational direction and a first rewind direction; a second head carriage having a transducer head mounted thereon and reciprocally moveable across the surface of the drum in a second operational direction and a second rewind direction; driving means continuously interconnecting said first and second head carriages for synchronously driving said first and second head carriages across the smooth surface of the drum in a predetermined phase relationship and at a slower speed in said first and second operational directions than in said first and second rewind directions, respectively, said driving means including apparatus for always driving at least one or the other of said head carriages in its operational directions and for driving both of said head carriages in their operational directions during a predetermined overlap period, thereby to enable the continuous recording of a single channel of information.

6. The combination defined in claim 5 wherein said driving means further includes apparatus for driving said first and second head carriages across the surface of a first and a second domain of the drum respectively, in synchronism with the rotation of the drum.

7. The combination defined in claim 6 which further includes commutation means coupled to the drum for rendering said first transducer head operable while said driving means drives said second head carriage in said second operational direction and for rendering said second transducer head inoperative while said first head carriage is driven in said first operational direction and before said second head carriage is driven in said second rewind direction.

8. The combination defined in claim 7 wherein said commutation means further include apparatus for rendering said second transducer head operable while said driving means drives said first head carriage in said first operational direction and for rendering said first transducer head inoperative while said second head carriage is driven in said second operational direction and before said first head carriage is driven in said first rewind direction.

9. The combination defined in claim 6 wherein said driving means includes a dual rate level-wind shaft operable when rotated for driving said first head carriage across the first domain of the drum and for driving said second head carriage across the second domain of the drum, and gear reduction means coupled to said rotating means for rotating said dual rate level wind shaft in synchronism with the rotation of the drum.

10. In a rotating magnetic drum memory device capable of continuously transducing a single channel of information, the combination comprising: a first head carriage having a first transducer head mounted thereon and reciprocally movable across the surface of the drum in a first operational direction and a first rewind direction; a second head carriage having a transducer head mounted thereon and reciprocally movable across the surface of the drum in a second operational direction and a second rewind direction; driving means synchronously coupling said first and second head carriages in a predetermined phase relation for driving said first and second head carriages across the surface of the drum to sequentially transduce a single channel of information, said driving means driving said first and second head carriages at a slower speed in said first and said second operational directions, than in said first and second rewind directions, respectively, said driving means including apparatus for always driving at least one or the other of said head carriages in its operational direction and for driving both of said head carriages in their operational directions during a predetermined overlap period whereby said single channel of information may be continuously transduced; and commutation means for switching between said first and second heads during the predetermined overlap period.

11. In a moving head memory drum for transducing a single channel of information the combination comprising: a first head carriage having a first transducer head mounted thereon and reciprocally movable across the surface of the drum in a first operational stroke and a first rewind stroke, said first transducer head generating a first signal; a second head carriage having a second transducer head mounted thereon and reciprocally movable across the surface of the drum in a second operational stroke and a second rewind stroke, said second transducer head generating a second read signal; and driving means for synchronously driving said first and second head carriages across the surface of the drum in synchronism with each other and with the drum at a slower speed in the operative stroke than in their rewind strokes, said carriages being operatively coupled to said drive means in a predetermined phase relationship whereby said driving means drives both said head carriages in their operational directions concurrently during a period of overlap to enable a continuous transducing of a single channel of information, said period occurring at the end of each operational stroke.

12. The combination defined in claim 11 which further includes a read signal output terminal, and commutation means having first and second modes of operation for applying said first and second read signals to said read signal output terminal in said first and second modes of operation, respectively, said commutation means being responsive to each period of overlap to change its mode of operation whereby a single channel of information is read by said first and second heads without loss of information.

13. The combination defined in claim 10 wherein said driving means further includes apparatus for driving said first and second head carriages across the surface of a first and a second domain of the drum respectively, in synchronism with the rotation of the drum respectively, in synchronism with the rotation of the drum.

14. The combination defined in claim 13 which further includes commutation means coupled to the drum for rendering said first transducer head operable while said driving means drives said second head carriage in said second operational direction and for rendering said second transducer head inoperative while said first head carriage is driven in said first operational direction and before said second head carriage is driven in said second rewind direction.

15. The combination defined in claim 14 wherein said commutation means further include apparatus for rendering said second transducer head operable while said driving means drives said first head carriage in said first operational direction and for rendering said first transducer head inoperative while said second head carriage is driven in said second operational direction and before said first head carriage is driven in said first rewind direction.

16. The combination defined in claim 13 wherein said driving means includes a dual rate level-wind shaft operable when rotated for driving said first head carriage across the first domain of the drum and for driving said second head carriage across the second domain of the drum, and gear reduction means coupled to said rotating means for rotating said dual rate level-wind shaft in synchronism with the rotation of the drum.

17. The combination defined in claim 16 wherein said dual rate level-wind shaft includes a first forward drive groove section having a pitch A, a first rewind drive groove section having a pitch B which is greater in magnitude than pitch A, and a pair of first turn around groove sections intercoupling said first forward drive groove section and said first rewind drive groove section for forming a first continuous groove, and wherein said dual rate level-wind shaft further includes a second forward drive groove section, a second rewind groove section and a pair of second turn around groove sections intercoupling said second rewind drive groove section and said second forward drive groove section for forming a second continuous groove, said first and second head carriages being slidably positioned on said first and second continuous grooves, respectively, so that during rotation of said first level-wind shaft one of said head carriages is always driven by the corresponding forward drive groove section of the corresponding continuous groove.

18. The combination defined in claim 17 wherein said first commutation means further includes first apparatus for rendering said first transducer head operable after said first head carriage slides onto said first turn around groove section and before said second head carriage slides onto said second turn around groove section and for rendering said second transducer head operable after said second head carriage slides onto said first turn around groove section and includes second apparatus for rendering said first transducer head inoperable after said second head carriage moves onto said second forward drive groove section and before said first head carriage moves onto said first turn around groove section and for rendering said second transducer head inoperable after said first head carriage moves onto said first forward drive groove section and before said second head carriage moves onto said second turn around groove section.

19. The combination defined in claim 12 wherein the surface of the memory drum includes a first and second memory surface domain and wherein said driving means includes apparatus for driving said first and second head carriages across said first and said second memory surface domain of the drum in synchronism with the rotation of the drum.

20. The combination defined in claim 10 which further includes commutation means coupled to the drum for rendering said first transducer inoperative when said first head carriage is driven in other than said first operative direction and for rendering said second transducer inoperative when said second head carriage is driven in other than said second operative direction.

References Cited by the Examiner

UNITED STATES PATENTS

| | | | |
|---|---|---|---|
| 330,596 | 11/85 | Lewis | 74—57 |
| 1,337,197 | 4/20 | Clausen | 179—6 |
| 1,992,575 | 2/35 | Johnson | 274—21 |
| 2,182,522 | 12/39 | Lindsey | 74—58 |
| 2,229,293 | 1/41 | Huntley | 179—100.2 |
| 2,698,427 | 12/54 | Steele | 340—174 |
| 2,852,761 | 9/58 | Hagopian | 340—174 |
| 2,907,009 | 9/59 | Lesser | 340—174 |
| 2,920,147 | 1/60 | Sellers et al. | 340—174.1 |

IRVING L. SRAGOW, *Primary Examiner.*

EVERETT R. REYNOLDS, *Examiner.*